(12) United States Patent
Wu

(10) Patent No.: US 9,794,961 B2
(45) Date of Patent: Oct. 17, 2017

(54) METHOD OF HANDLING RANDOM ACCESS IN WIRELESS COMMUNICATION SYSTEM

(71) Applicant: HTC Corporation, Taoyuan County (TW)

(72) Inventor: Chih-Hsiang Wu, Taoyuan County (TW)

(73) Assignee: HTC Corporation, Taoyuan (TW)

(*) Notice: Subject to any disclaimer, the term of this patent is extended or adjusted under 35 U.S.C. 154(b) by 279 days.

(21) Appl. No.: 14/529,131

(22) Filed: Oct. 30, 2014

(65) Prior Publication Data

US 2015/0117374 A1 Apr. 30, 2015

Related U.S. Application Data

(60) Provisional application No. 61/898,450, filed on Oct. 31, 2013.

(51) Int. Cl.
*H04W 4/00* (2009.01)
*H04W 72/00* (2009.01)
*H04W 74/08* (2009.01)

(52) U.S. Cl.
CPC ... *H04W 74/0891* (2013.01); *H04W 74/0833* (2013.01)

(58) Field of Classification Search
CPC .............. H04W 74/0833; H04W 74/0891
See application file for complete search history.

(56) References Cited

U.S. PATENT DOCUMENTS

| 8,693,448 | B2* | 4/2014 | Vujcic | H04W 74/0833 370/337 |
|---|---|---|---|---|
| 2009/0303896 | A1* | 12/2009 | Che | H04W 74/006 370/252 |
| 2010/0331003 | A1* | 12/2010 | Park | H04W 74/0866 455/450 |
| 2013/0188473 | A1* | 7/2013 | Dinan | H04W 56/0005 370/216 |

(Continued)

FOREIGN PATENT DOCUMENTS

| CN | 101300755 A | 11/2008 |
|---|---|---|
| CN | 101562897 A | 10/2009 |

(Continued)

OTHER PUBLICATIONS

European Search report dated Mar. 3, 2015 for EP application No. 14191247.7.

(Continued)

*Primary Examiner* — Charles C Jiang
*Assistant Examiner* — Ryan Kavleski
(74) *Attorney, Agent, or Firm* — Winston Hsu

(57) ABSTRACT

A method of handling random access for a user equipment of a wireless communication system includes transmitting a plurality of repetitions of a random access preamble to a network of the wireless communication system; and monitoring a physical downlink control channel (PDCCH) in a plurality of random access response windows for receiving a random access response identified by a random access radio network temporary identifier (RA-RNTI) from the network, wherein each of the plurality of random access response windows is corresponding to one of the plurality of repetitions of the random access preamble.

13 Claims, 12 Drawing Sheets

(56) References Cited

U.S. PATENT DOCUMENTS

| | | | | |
|---|---|---|---|---|
| 2013/0201960 A1* | 8/2013 | Kim | ............... | H04W 72/0446 370/331 |
| 2013/0258969 A1* | 10/2013 | Ye | ............... | H04W 74/04 370/329 |
| 2014/0112254 A1* | 4/2014 | Lindoff | ............... | H04W 74/002 370/328 |
| 2015/0016312 A1* | 1/2015 | Li | ............... | H04W 74/0833 370/280 |
| 2015/0057011 A1* | 2/2015 | Di Girolamo | .... | H04W 74/0808 455/454 |
| 2015/0124746 A1* | 5/2015 | Wu | ............... | H04W 74/008 370/329 |
| 2016/0165640 A1* | 6/2016 | Yang | ............... | H04W 4/005 370/336 |

FOREIGN PATENT DOCUMENTS

| | | |
|---|---|---|
| CN | 102333521 A | 1/2012 |
| WO | 2007052972 A1 | 5/2007 |
| WO | 2010052522 A1 | 5/2010 |
| WO | 2010077004 A2 | 7/2010 |

OTHER PUBLICATIONS

Ming-Yuan Cheng et al., "Overload Control for Machine-Type-Communications in LTE-Advanced System", Jun. 2012, pp. 38-45, vol. 50, No. 6, IEEE Communications Magazine, IEEE Service Center, XP011446095.

3GPP TR 36.888 V12.0.0 (Jun. 2013), "3rd Generation Partnership Project; Technical Specification Group Radio Access Network; Study on provision of low-cost Machine-Type Communications (MTC) User Equipments (UEs) based on LTE (Release 12)", pp. 1-55.

3GPP TS 36.300 V11.7.0 (Sep. 2013), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", pp. 1-209.

3GPP TS 36.331 V11.5.0 (Sep. 2013),"3rd Generation Partnership Project; Technical Specification Group Radio Access Network; Evolved Universal Terrestrial Radio Access (E-UTRA); Radio Resource Control (RRC); Protocol specification (Release 11)", pp. 1-347.

3GPP TS 36.321 V11.3.0 (Jun. 2013), "3rd Generation Partnership Project; Technical Specification Group Radio Access Network; Evolved Universal Terrestrial Radio Access (E-UTRA); Medium Access Control (MAC) protocol specification (Release 11)", pp. 1-57.

Office action dated Jun. 26, 2017 for the China application No. 201410605693.7, filing date Oct. 31, 2014, p. 1-11.

* cited by examiner

METHOD OF HANDLING RANDOM ACCESS IN WIRELESS COMMUNICATION SYSTEM

CROSS REFERENCE TO RELATED APPLICATIONS

This application claims the benefit of U.S. Provisional Application No. 61/898,450, filed on Oct. 31, 2013 and titled "Method and Apparatus for random access in enhanced coverage mode in a wireless communication system", the contents of which are incorporated herein by reference.

BACKGROUND OF THE INVENTION

1. Field of the Invention

The present invention relates to a method utilized in a wireless communication system, and more particularly, to a method of handling random access for a user equipment with coverage enhancement in a wireless communication system.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of a universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques such as carrier aggregation (CA), coordinated multipoint (COMP) transmission/reception, uplink (UL) multiple-input multiple-output (MIMO), etc. For a UE and an eNB to communicate with each other in the LTE-A system, the UE and the eNB must support standards developed for the LTE-A system, such as the 3GPP Rel-10 standard or later versions.

A machine type communication (MTC) device which can automatically perform predefined jobs and report corresponding results to other devices, a server, a Node-B (NB) or an eNB can be used in various areas, such as security, tracking and tracing, payment, healthcare, metering, etc. Further, the MTC device preferably reports the corresponding results via a wireless link such that limitation caused by environment can be removed. However, the wireless link used by the MTC device is needed to be established, and radio resources required by the wireless link is needed to be allocated (i.e., assigned). Reuse of existing infrastructures and wireless communication systems becomes a viable choice for operations of the MTC device. Therefore, the UMTS, the LTE system and the LTE-A system, etc., developed by the 3GPP which are widely deployed are suitable for the operations of the MTC device. An MTC device is considered to be a type of UE.

Some MTC devices may be installed in the basements of residential buildings or locations shielded by foil-backed insulation, metalized windows or traditional thick-walled building construction, and these devices would experience more significant penetration losses on the radio interface than normal LTE devices. The MTC devices in the extreme coverage scenario might have characteristics such as very low data rate, greater delay tolerance and no mobility, and therefore some messages/channels may not be required. In such an extreme coverage scenario, MTC UEs work at an enhanced coverage mode in which signaling, data transmission and radio resources may be of different forms than those for the UEs in the ordinary environment.

More energy can be accumulated to improve coverage by prolonging transmission time. The existing transmission time interval (TTI) bundling and hybrid automatic repeat request (HARQ) retransmission in data channel can be helpful. Note that since the current maximum number of UL HARQ retransmissions is 28 and TTI bundling is up to 4 consecutive subframes, TTI bundling with a larger TTI bundle size may be considered and the maximum number of HARQ retransmissions may be extended to achieve better performances. Other than the TTI bundling and HARQ retransmission, repetition can be applied by repeating the same or different redundancy versions (RV) multiple times. In addition, code spreading in the time domain can also be considered to improve coverage. MTC traffic packets could be radio link control (RLC) transmission segmented into smaller packets; very low rate coding, lower modulation order (e.g. BPSK) and shorter length cyclic redundancy check (CRC) may also be used. New decoding techniques (e.g. correlation or reduced search space decoding) can be used to improve coverage by taking into account the characteristics of the particular channels (e.g., channel periodicity, rate of parameter changes, channel structure, limited content, etc.) and the relaxed performance requirements (e.g. delay tolerance).

When a UE initiates a random access procedure to get uplink synchronization with an eNB, the UE transmits a random access preamble. Once the random access preamble is transmitted, the UE shall monitor the physical downlink control channel (PDCCH) for random access response(s) identified by the random access radio network temporary identifier (RA-RNTI) defined below, in a random access response window which starts at the subframe that contains the end of the preamble transmission plus 3 subframes and has a length equal to ra-ResponseWindowSize, (e.g., 10 subframes). The RA-RNTI associated with the physical random access channel (PRACH) in which the random access preamble is transmitted is computed as:

$$\text{RA-RNTI} = 1 + t\_id + 10 \times f\_id;$$

where t_id is the index of the first subframe of the specified PRACH ($0 \leq t\_id < 10$), and f_id is the index of the specified PRACH within that subframe, in ascending order of frequency domain ($0 \leq f\_id < 6$). The UE may stop monitoring for random access response(s) after successful reception of a random access response containing random access preamble identifiers that match the transmitted random access preamble.

When a UE (e.g., an MTC device) initiates a random access procedure in the enhanced coverage mode, the UE performs repetitions of a random access preamble transmission to an eNB. However, the UE starts to monitor the PDCCH for random access response(s) identified by the RA-RNTI in the random access response window which starts at the subframe that contains the end of the preamble transmission plus 3 subframes and has a length equal to ra-ResponseWindowSize (e.g., 10 subframes). If the UE cannot receive the random access response containing a random access preamble identifier corresponding to the transmitted random access preamble in the random access response window, the UE determines that the random access response reception is not successful. Due to the unsuccessful random access response reception, in one case, the UE may consider there is a problem and trigger a radio resource control (RRC) connection re-establishment procedure. In another case, the UE may delay subsequent random access preamble transmission(s) by a backoff time. However, the UE in the enhanced coverage mode unnecessarily meets one of the two cases but actually the UE has not finished repetitions of the random access preamble transmission. Therefore, the UE in the enhanced coverage mode has even worse performance in the random access procedure due to interruption of the random access procedure.

Thus, there is a need for improvement over the prior art.

SUMMARY OF THE INVENTION

It is therefore an objective of the present invention to provide a method of handling random access with coverage enhancement in a wireless communication system to solve the abovementioned problem.

The present invention discloses a method of handling random access for a user equipment of a wireless communication system. The method comprises transmitting a plurality of repetitions of a random access preamble to a network of the wireless communication system; and monitoring a physical downlink control channel (PDCCH) in a plurality of random access response windows for receiving a random access response identified by a random access radio network temporary identifier (RA-RNTI) from the network, wherein each of the plurality of random access response windows is corresponding to one of the plurality of repetitions of the random access preamble.

The present invention further discloses a method of handling random access for a user equipment of a wireless communication system. The method comprises transmitting a plurality of repetitions of a random access preamble to a network of the wireless communication system; and monitoring a PDCCH in a random access response window which starts at a first subframe containing the end of the first repetition of the random access preamble plus M subframes and ends at a second subframe containing the end of the last repetition of the random access preamble plus N+W subframes, for receiving a random access response identified by a RA-RNTI from the network.

The present invention further discloses a method of handling random access for a user equipment of a wireless communication system. The method comprises transmitting a plurality of repetitions of a random access preamble to a network of the wireless communication system; and monitoring a PDCCH in a random access response window which starts at a subframe containing the end of the first repetition of the random access preamble plus N subframes and has a length X subframes, for receiving a random access response identified by a RA-RNTI from the network.

The present invention further discloses a method of handling random access for a user equipment of a wireless communication system. The method comprises transmitting a plurality of repetitions of a random access preamble to a network of the wireless communication system; and monitoring a PDCCH in at least one random access response window, wherein each of the at least one random access response window starts at a subframe containing the end of the last repetition of a first number of consecutive preamble repetitions of the plurality of repetitions of the random access preamble plus N subframes and has a length X subframes, for receiving a random access response identified by a RA-RNTI from the network.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
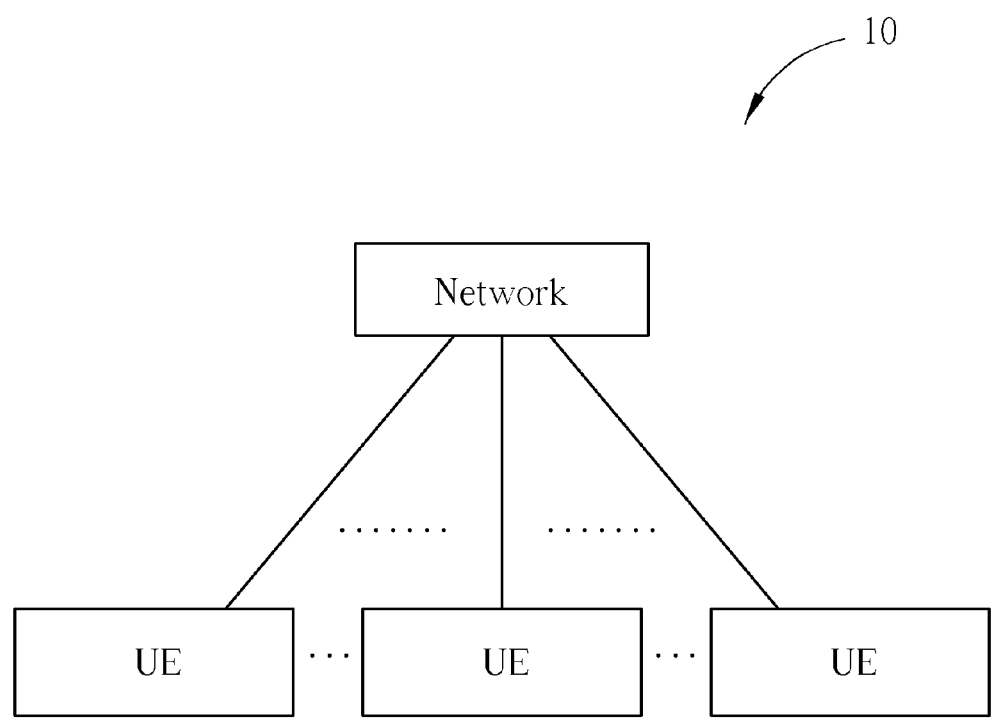
FIG. 1 is a schematic diagram of a wireless communication system according to an embodiment of the present invention.

Please refer to FIG. 1, which is a schematic diagram of a wireless communication system 10 according to an embodiment of the present invention. The wireless communication system 10 is briefly composed of a network and a plurality of user equipments (UEs). In FIG. 1, the network and the UEs are simply utilized for illustrating the structure of the wireless communication system 10. Practically, the network can be a universal terrestrial radio access network (UTRAN) comprising a plurality of Node-Bs (NBs) in a universal mobile telecommunications system (UMTS). Alternatively, the network can be an evolved UTRAN (E-UTRAN) comprising a plurality of evolved NBs (eNBs) and/or relays in a long term evolution (LTE) system, a LTE-Advanced (LTE-A) system or an evolution of the LTE-A system.

Furthermore, the network can also include both the UTRAN/E-UTRAN and a core network, wherein the core network includes network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a UE, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. In addition, the information can be processed by both the UTRAN/E-UTRAN and the core network, and the decisions are made after coordination and/or cooperation are performed by the UTRAN/E-UTRAN and the core network. A UE can be a machine type communication (MTC) device, a mobile phone, a laptop, a tablet computer, an electronic book or a portable computer system but is not limited. In addition, the network and the UE can be seen as a transmitter or a receiver according to direction, e.g., for an uplink (UL), the UE is the transmitter and the network is the receiver, and for a downlink (DL), the network is the transmitter and the UE is the receiver. More specifically, for the network, the direction of the transmission is DL, and the direction of the reception is UL. For the UE, the direction of the transmission is UL, and the direction of the reception is DL.

Figure 2:
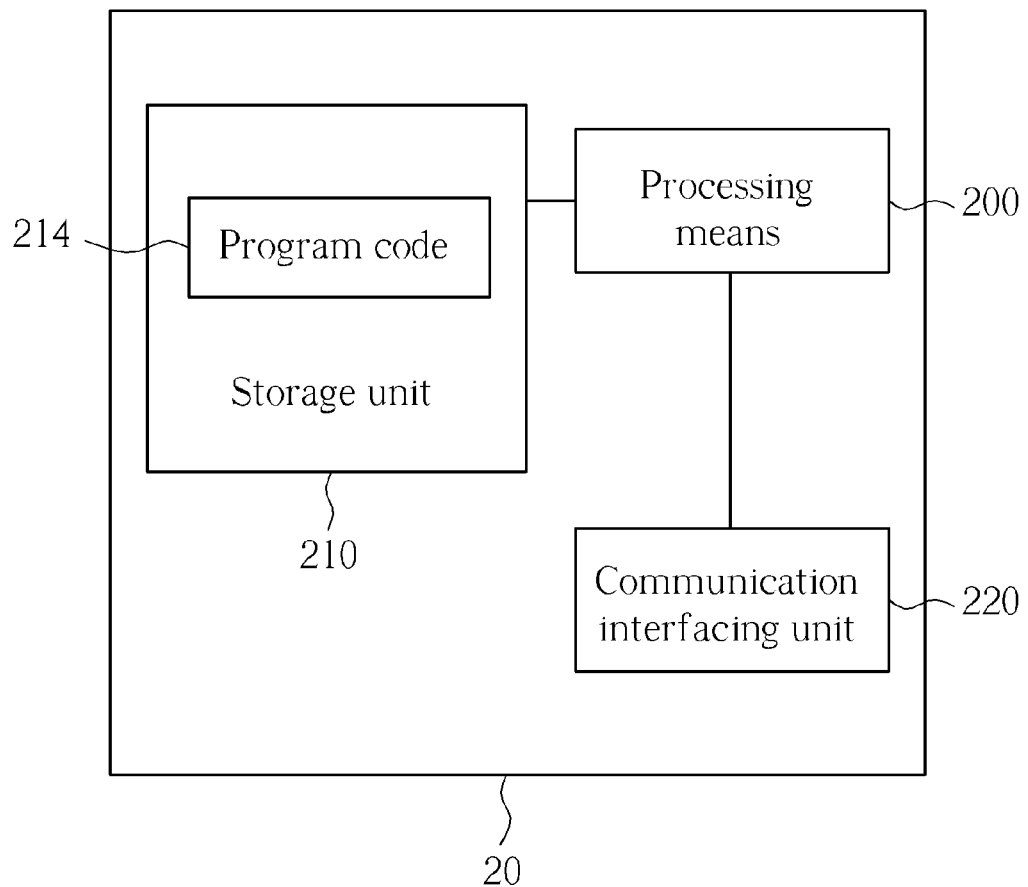
FIG. 2 is a schematic diagram of a communication device according to an embodiment of the present invention.

Please refer to FIG. 2, which is a schematic diagram of a communication device 20 according to an embodiment of the present invention. The communication device 20 can be a UE or the network shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store a program code 214, accessed and executed by the processing means 200. Examples of the storage unit 210 include but are not limited to a subscriber identity module (SIM), read-only memory (ROM), flash memory, random-access memory (RAM), CD-ROM/DVD-ROM, magnetic tape, hard disk and optical data storage device. The communication interfacing unit 220 is preferably a transceiver and is used to transmit and receive signals (e.g., messages or packets) according to processing results of the processing means 200.

Figure 3:
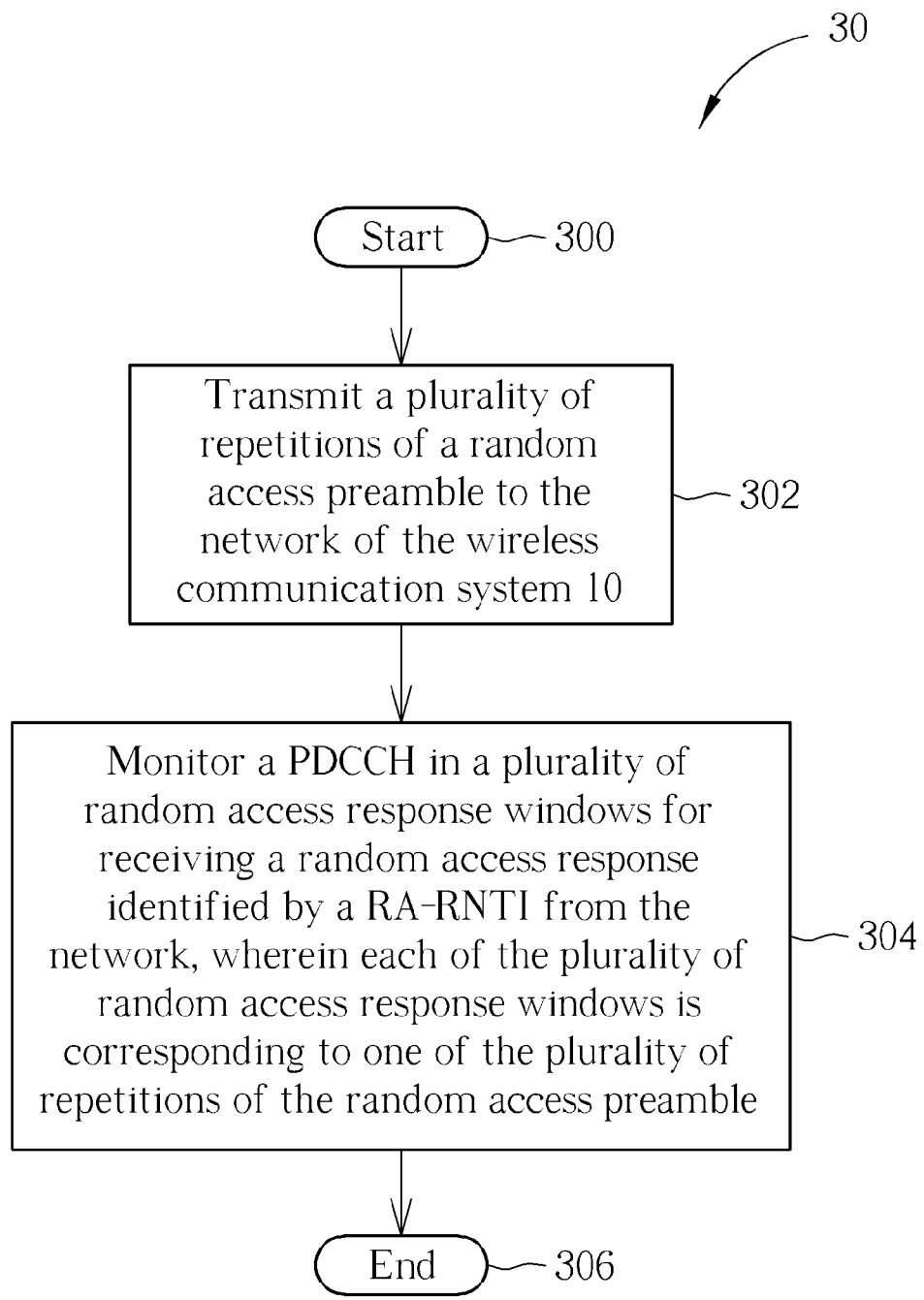
FIG. 3 is a flowchart of a process according to an embodiment of the present invention.

Please refer to FIG. 3, which is a flowchart of a process 30 according to an embodiment of the present invention. The process 30 may be utilized in a UE of the wireless communication system 10 shown in FIG. 1, for handling random access with coverage enhancement. The process 30 may be compiled into the program code 214 and includes the following steps:

Step 300: Start.

Step 302: Transmit a plurality of repetitions of a random access preamble to the network of the wireless communication system 10.

Step 304: Monitor a physical downlink control channel (PDCCH) in a plurality of random access response windows for receiving a random access response identified by a random access radio network temporary identifier (RA-RNTI) from the network, wherein each of the plurality of random access response windows is corresponding to one of the plurality of repetitions of the random access preamble.

Step 306: End.

According to the process 30, the UE in an enhanced coverage mode first transmits a plurality of repetitions of a random access preamble, on a physical random access channel (PRACH), in a random access procedure for uplink synchronization with an eNB. The random access preamble is corresponding to a random access preamble identifier (RAPID), and a random access radio network temporary identifier (RA-RNTI) identifies which time-frequency resource is utilized by the UE to transmit the random access preamble (or preamble repetition). After transmitting the random access preamble, the UE monitors the PDCCH in a plurality of random access response windows, for receiving a random access response identified by the RA-RNTI. Each random access response window is corresponding to one of the plurality of repetitions of the random access preamble. In an example according to the process 30, if the UE transmits 100 repetitions of the random access preamble, the UE may monitor the PDCCH in 100 corresponding random access response windows for receiving the random access response identified by the RA-RNTI.

Note that for the eNB, when transmitting a random access response message, the RA-RNTI is used in the PDCCH on which downlink control information (DCI) has a preconfigured format (i.e., DCI format) with a CRC (Cyclic Redundancy Code) scrambled with the RA-RNTI. Also note that, the UE receives and decodes the PDCCH, scrambled with the RA-RNTI by using the RA-RNTI. There may be several ways to decode the PDCCH scrambled with the RA-RNTI by using the RA-RNTI. In one example, the UE performs descrambling on the scrambled CRC by the RA-RNTI to get the CRC. Then the UE calculates another CRC from the DCI and checks if the received DCI is for the UE itself by comparing the CRC with the calculated CRC. If the CRC is same as the calculated CRC, the received DCI is for the UE. In another example, the UE scrambles the other CRC with RA-RNTI to get the other scrambled CRC and compares the received scrambled CRC with the other scrambled CRC. If the received scrambled CRC is same as the other scrambled CRC, the received DCI is for the UE. In view of the eNB, the eNB may transmit only one or more than one random access response in response to a received preamble repetition. On the other side, the UE manages the plurality of random access response windows, and the UE keeps decoding PDCCHs until successfully receiving a random access response containing a random access preamble identifier (RAPID) that matches the transmitted random access preamble. More detail about the random access procedure and related physical layer procedure are referred to 3GPP TS 36.321 (MAC layer procedure), 36.212 (Multiplexing and channel coding), 36.213 (physical layer procedure) specifications.

When the UE is in the enhanced coverage mode and multiple repetitions of the random access preamble are transmitted, the UE configures the plurality of random access response windows instead of only one random access response window as in the prior art. Therefore, the issue that the UE may interrupt the random access procedure due to unsuccessful reception of the random access response(s) identified by the RA-RNTI in the random access response window before finishing the repetitions of the random access preamble transmission may be avoided.

In an embodiment, each of the random access response windows may start at a subframe containing the end of the corresponding repetition of the random access preamble plus N subframes, wherein N subframes are greater than or equal to a minimum delay based on the system environment, e.g., 3 ms (in current LTE/LTE-A system), in which 2 ms is the propagation delay in the air that UE transmits the random access preamble and the eNB transmits the random access response and 1 ms is the processing time that the eNB processes the received random access preamble and prepares for the random access response. The value of N may be configured according to system requirements. For example, the value of N may be configured statically, such as specified by a standard or specification. Alternatively, the value of N may be configured dynamically, such as determined by the eNB; in this case, the eNB may broadcast information related to the value of N to the UE via system information. In addition, each of the random access response windows may have a length ra-ResponseWindowSize subframes (e.g., 10 subframes), and the length is long enough for the UE to receive the corresponding random access response in the random access response window. The ra-ResponseWindowSize may be configured via system information or specified in a standard or specification.

Figure 4:
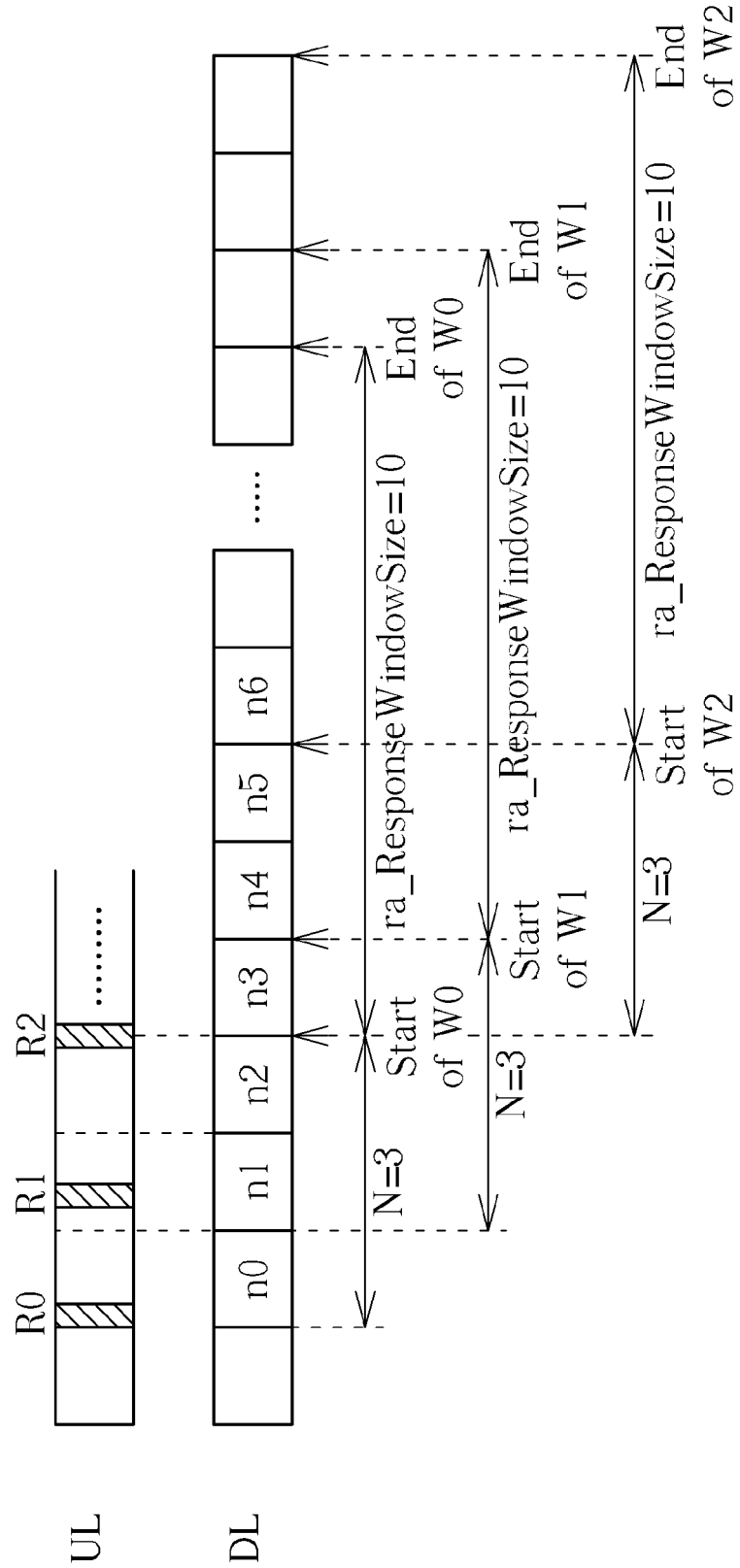
FIG. 4 is a schematic diagram of an exemplary example of the plurality of random access response windows of the process shown in FIG. 3.

Please refer to FIG. 4, which is a schematic diagram of an exemplary example of the plurality of random access response windows of the process 30. As shown in FIG. 4, a UE transmits 3 repetitions R0-R2 of a random access preamble to an eNB on a physical random access channel (PRACH). The UE may monitor the PDCCH in 3 random access response windows W0-W2 respectively corresponding to the preamble repetitions R0-R2. Each of the random access response windows W0-W2 starts at a subframe containing the end of the corresponding preamble repetition R0-R2 plus N subframes, wherein N is equal to 3 in the example shown in FIG. 4. Each of the random access response windows W0-W2 has a length ra-ResponseWindowSize subframes (e.g., 10 subframes), which allows the UE to monitor the PDCCH and receive a random access response identified by the RA-RNTI. In one example of FIG. 4, the preamble repetition R0 starts at the subframe n0 and ends at the same subframe n0, so that the corresponding random access response window W0 starts at the subframe n3, which is the subframe containing the end of the preamble repetition R0, subframe n0, plus 3 subframes. In another example of FIG. 4, the preamble repetition R2 starts at the subframe n2 and ends at the next subframe n3, so that the corresponding random access response window W2 starts at the subframe n6, which is the subframe containing the end of the preamble repetition R2, subframe n3, plus 3 subframes. Note that N may also be configured to a value greater than 3, which is not limited herein.

As shown in FIG. 4, the random access response windows W0-W2 are overlapped by each other. In general, the random access response windows may or may not be overlapped according to subframes corresponding to the preamble repetitions transmitted by the UE, which should not be limited herein.

Figure 5:
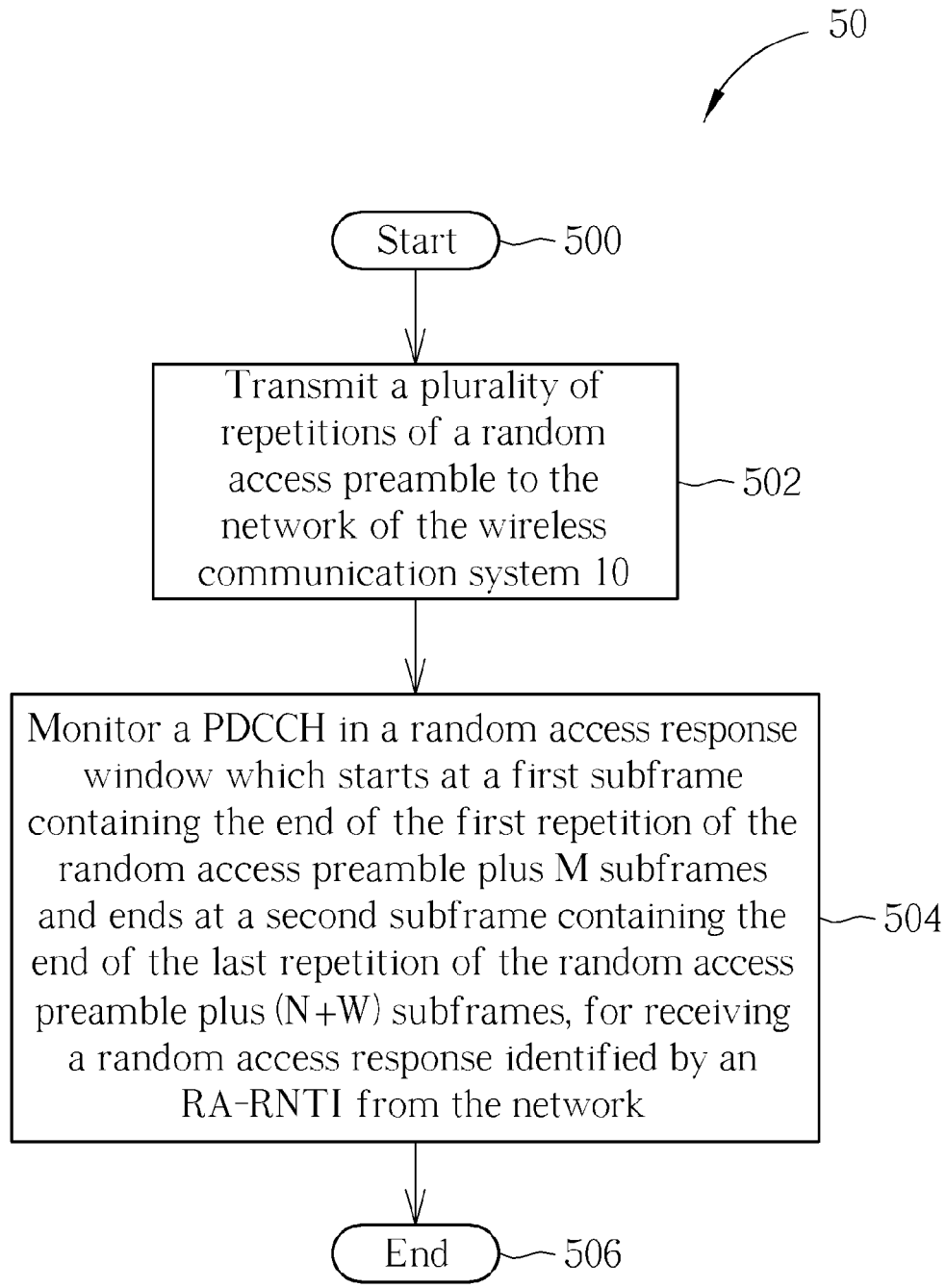
FIG. 5 is a flowchart of a process according to an embodiment of the present invention.

Please refer to FIG. 5, which is a flowchart of a process 50 according to an embodiment of the present invention. The process 50 may be utilized in a UE of the wireless communication system 10 shown in FIG. 1, for handling random access with coverage enhancement. The process 50 may be compiled into the program code 214 and includes the following steps:

Step 500: Start.

Step 502: Transmit a plurality of repetitions of a random access preamble to the network of the wireless communication system 10.

Step 504: Monitor a PDCCH in a random access response window which starts at a first subframe containing the end of the first repetition of the random access preamble plus M subframes and ends at a second subframe containing the end of the last repetition of the random access preamble plus (N+W) subframes, for receiving a random access response identified by an RA-RNTI from the network.

Step 506: End.

According to the process 50, the UE in an enhanced coverage mode first transmits a plurality of repetitions of a random access preamble on the PRACH in a random access procedure for uplink synchronization with an eNB. The UE monitors the PDCCH in a random access response window, which starts at a first subframe containing the end of the first preamble repetition plus M subframes and ends at a second subframe containing the end of the last preamble repetition plus (N+W) subframes, wherein M and N may be configured by the eNB via system information or specified in a standard or specification and W may be ra-ResponseWindowSize (e.g., 10 subframes) configured via system information or specified in a standard or specification. According to the process 50, the UE may monitor the PDCCH in the random access response window longer than the random access response window configured in the conventional art, for receiving the random access response identified by a RA-RNTI that identifies which time-frequency resource is utilized by the UE to transmit the random access preamble. Thus, the possibility of receiving the random access response is enhanced.

Since the UE may monitor the PDCCH in the random access response window starting at a subframe determined based on the transmission of the first preamble repetition and ending at a subframe determined based on the transmission of the last preamble repetition, the UE may have more time to successfully receive the downlink assignment for the RA-RNTI in the PDCCH so as to receive a random access response (in PDSCH) containing the RAPID that matches the transmitted random access preamble. Therefore, the issue that the UE may interrupt the random access procedure due to unsuccessful reception of the random access response(s) before finishing the repetitions of the random access preamble transmission may be avoided.

The values of M, N and W in the process 50 may be configured according to system requirements. For example, the values of M, N and W may be configured statically, such as specified by a standard or specification. Alternatively, the values of M, N and W may be configured dynamically, such as determined by the eNB; in this case, the eNB may broadcast information related to the values of M, N and W to the UE via system information.

Figure 6:
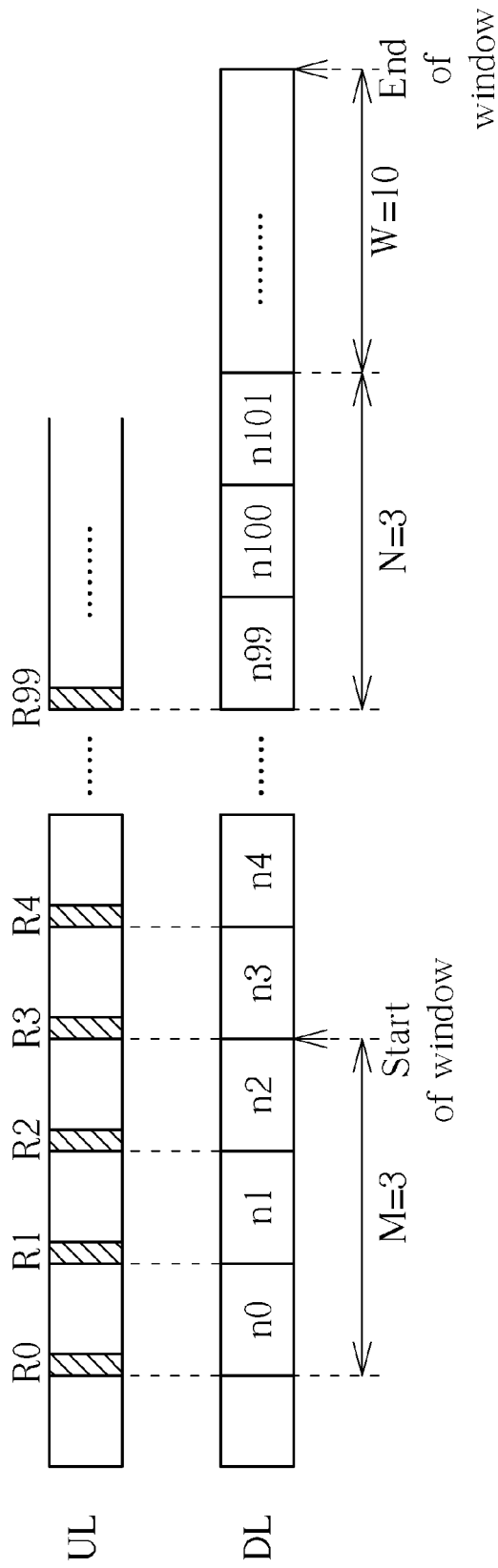
FIG. 6 is a schematic diagram of an exemplary example of the random access response window of the process shown in FIG. 5.

Please refer to FIG. 6, which is a schematic diagram of an exemplary example of the random access response window of the process 50. As shown in FIG. 6, a UE transmits 100 repetitions R0-R99 of a random access preamble to an eNB on a PRACH. The UE may monitor the PDCCH in a random access response window, which starts at the subframe containing the end of the preamble repetition R0 plus M subframes, and ends at the subframe containing the end of the preamble repetition R99 plus (N+W) subframes, wherein M and N may be configured by the eNB via system information and W may be ra-ResponseWindowSize (e.g., 10 subframes) configured via system information or specified in a standard or specification. Please note that M and N are equal to 3 in the example shown in FIG. 6, but in other embodiments, M and N may be configured to values greater than 3, which should not be limited herein.

It should be noted that FIG. 4 and FIG. 6 showing transmitting repetitions of the random access preamble in consecutive subframes are illustrated examples and in reality, not all repetitions of the random access preamble are transmitted in consecutive subframes because the eNB may allow only several subframes, not the whole radio frame, for PRACH transmission.

Figure 7:
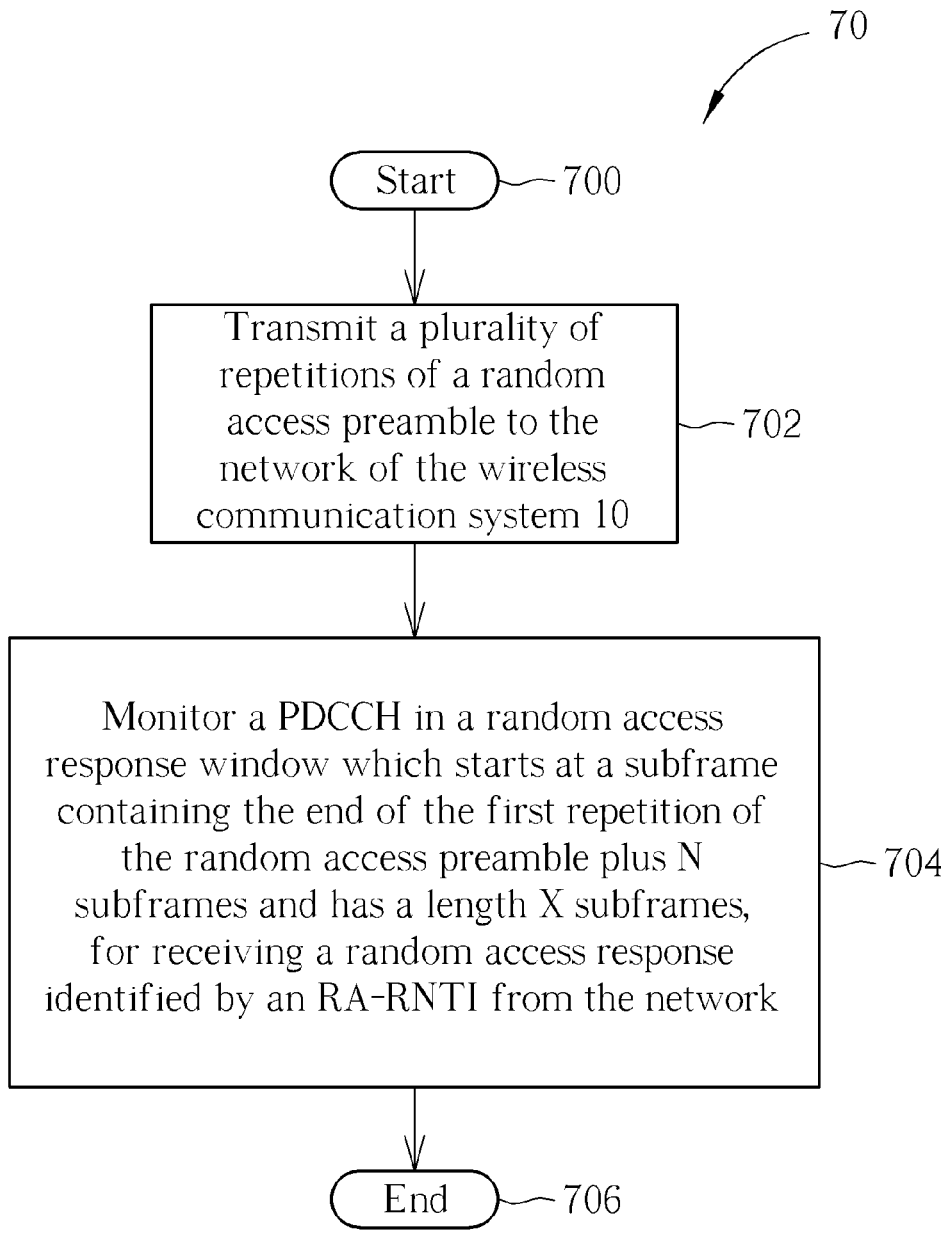
FIG. 7 is a flowchart of a process according to an embodiment of the present invention.

Please refer to FIG. 7, which is a flowchart of a process 70 according to an embodiment of the present invention. The process 70 may be utilized in a UE of the wireless communication system 10 shown in FIG. 1, for handling random access with coverage enhancement. The process 70 may be compiled into the program code 214 and includes the following steps:

Step 700: Start.

Step 702: Transmit a plurality of repetitions of a random access preamble to the network of the wireless communication system 10.

Step 704: Monitor a PDCCH in a random access response window which starts at a subframe containing the end of the first repetition of the random access preamble plus N subframes and has a length X subframes, for receiving a random access response identified by an RA-RNTI from the network.

Step 706: End.

According to the process 70, the UE in an enhanced coverage mode first transmits a plurality of repetitions of a random access preamble on the PRACH in a random access procedure for uplink synchronization with an eNB. The UE monitors the PDCCH in a random access response window, which starts at a subframe containing the end of the first repetition of the random access preamble plus N subframes and has a length X subframes, wherein N subframes are greater than or equal to the minimum delay based on the system environment, e.g., 3 ms (in current LTE/LTE-A system), in which 2 ms is the propagation delay in the air that UE transmits the random access preamble and the eNB transmits the random access response and 1 ms is the processing time that the eNB processes the received random access preamble and prepares for the random access response, and X is a preconfigured random access response window size larger than a random access response window size ra-ResponseWindowSize (e.g., 10 subframes) as in the conventional art. Therefore, the UE may monitor the PDCCH in a random access response window large enough for the random access response(s) identified by a RA-RNTI that identifies which time-frequency resource is utilized by the UE to transmit the random access preamble.

Please note that, when the UE is in the enhanced coverage mode and multiple repetitions of the random access preamble are transmitted, the random access response window configured by the UE has different characteristics than the random access response window predefined in the prior art. More specifically, the length of the random access response window X subframes is larger than the legacy length ra-ResponseWindowSize subframes specified in the 3GPP standard. The value of X may be determined arbitrarily but should be large enough to cover all possible PDCCHs in which the eNB may transmit a random access response in response to the random access preamble transmitted by the UE. For example, the value of X may make the random access response window end at a subframe equal to the subframe containing the end of the last preamble repetition plus N subframes, where N is greater than or equal to 3 (as the aforementioned minimum delay due to system environment). That is, the value of X allows the UE to successfully receive the random access response which is possibly corresponding to the last repetition of the random access preamble. Therefore, the issue that the UE may interrupt the random access procedure due to unsuccessful reception of the random access response(s) in the random access response window before finishing the repetitions of the random access preamble transmission may be avoided.

The values of N and corresponding X in the process 70 may be configured according to system requirements. For example, the values of N and X may be configured statically, such as specified by a standard or specification. Alternatively, the values of N and X may be configured dynamically, such as determined by the eNB; in this case, the eNB may broadcast information related to the values of N and X to the UE via system information.

Figure 8:
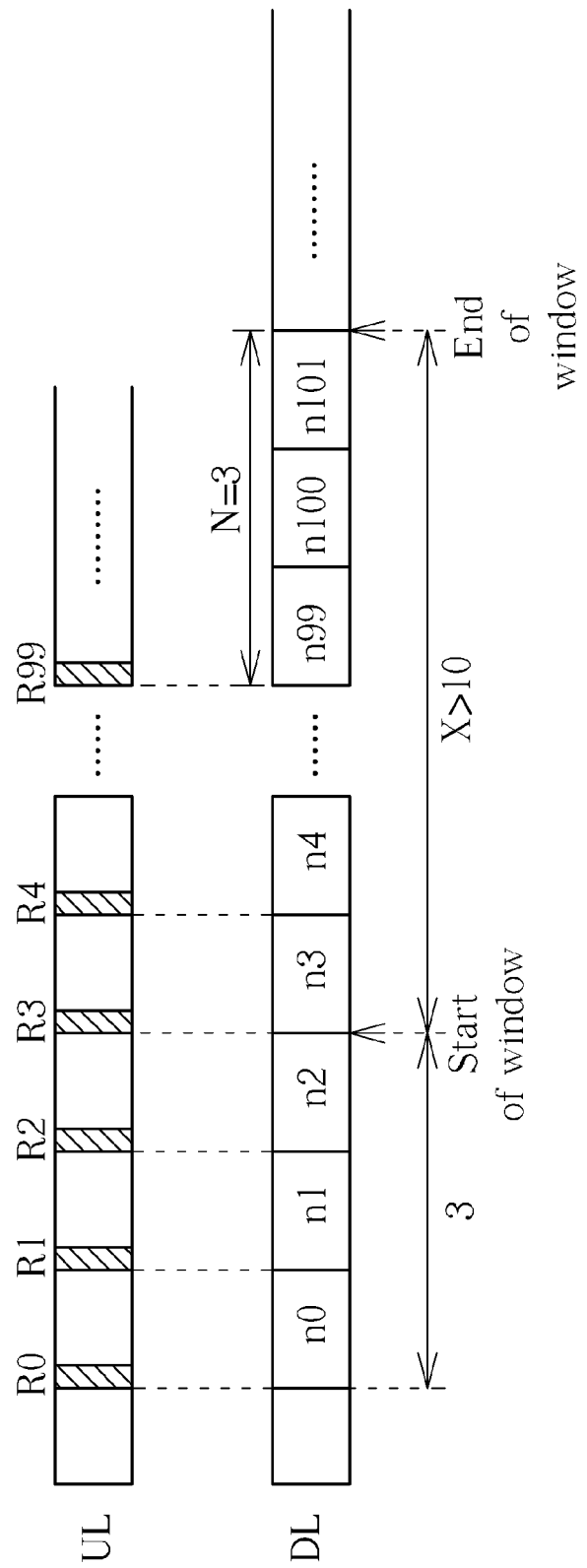
FIG. 8 is a schematic diagram of an exemplary example of the random access response window of the process shown in FIG. 7.

Please refer to FIG. 8, which is a schematic diagram of an exemplary example of the random access response window of the process 70. As shown in FIG. 8, a UE transmits 100 repetitions R0-R99 of a random access preamble to an eNB on a PRACH. The UE may monitor the PDCCH in a random access response window, which starts at the subframe containing the end of the preamble repetition R0 plus 3 subframes and has a length X subframes. The value of X is greater than ra-ResponseWindowSize (e.g., 10 subframes) and makes the random access response window end at the subframe containing the end of the preamble repetition R99 plus N subframes, where N is equal to 3 in the example shown in FIG. 8. In other embodiments, N may also be configured to a value greater than 3, which should not be limited herein.

Figure 9:
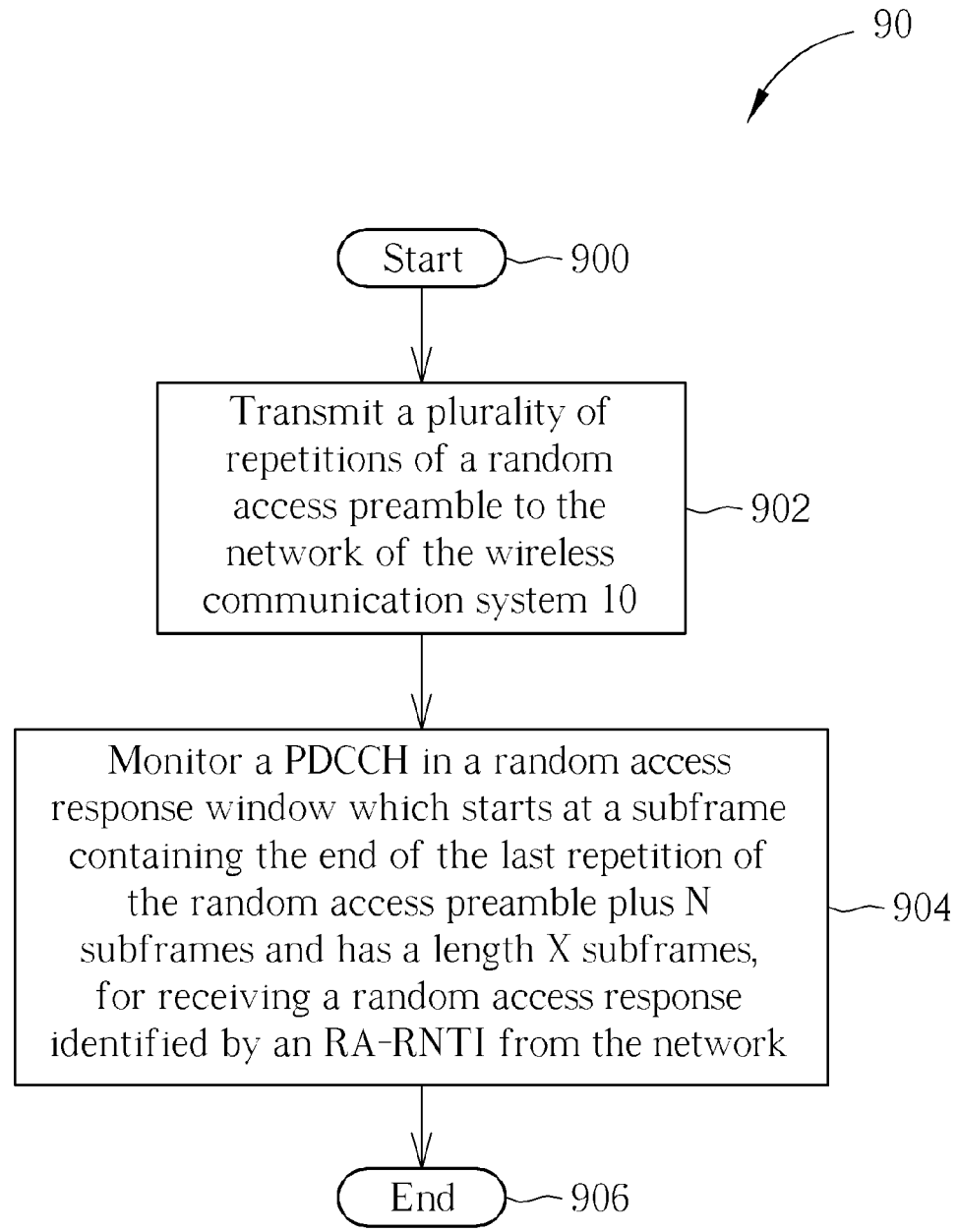
FIG. 9 is a flowchart of a process according to an embodiment of the present invention.

Please refer to FIG. 9, which is a flowchart of a process 90 according to an embodiment of the present invention. The process 90 may be utilized in a UE of the wireless communication system 10 shown in FIG. 1, for handling random access with coverage enhancement. The process 90 may be compiled into the program code 214 and includes the following steps:

Step 900: Start.

Step 902: Transmit a plurality of repetitions of a random access preamble to the network of the wireless communication system 10.

Step 904: Monitor a PDCCH in a random access response window which starts at a subframe containing the end of the last repetition of the random access preamble plus N subframes and has a length X subframes, for receiving a random access response identified by an RA-RNTI from the network.

Step 906: End.

According to the process 90, the UE in an enhanced coverage mode first transmits a plurality of repetitions of a random access preamble on the PRACH in a random access procedure for uplink synchronization with an eNB. The UE monitors the PDCCH in a random access response window, which starts at a subframe containing the end of the last repetition of the random access preamble plus N subframes and has a length X subframes. In one embodiment, N subframes are greater than or equal to the minimum delay based on the system environment, e.g., 3 ms, and X is a preconfigured random access response window size or a random access response window size ra-ResponseWindowSize (e.g., 10 subframes) as in the conventional art. Therefore, the UE may monitor the PDCCH in the random access response window for the random access response(s) identified by a RA-RNTI.

The UE may monitor the random access response(s) after all of the preamble repetitions are transmitted. This enhances the possibility that the UE successfully receives the random access response(s) and accomplishes the random access procedure since the eNB may successfully receive the random access preamble by receiving more repetitions of the random access preamble and then transmits the random access response.

The value of N in the process 90 may be configured according to system requirements. For example, the value of N may be configured statically, such as specified by a standard or specification. Alternatively, the value of N may be configured dynamically, such as determined by the eNB; in this case, the eNB may broadcast information related to the value of N to the UE via system information.

Figure 10:
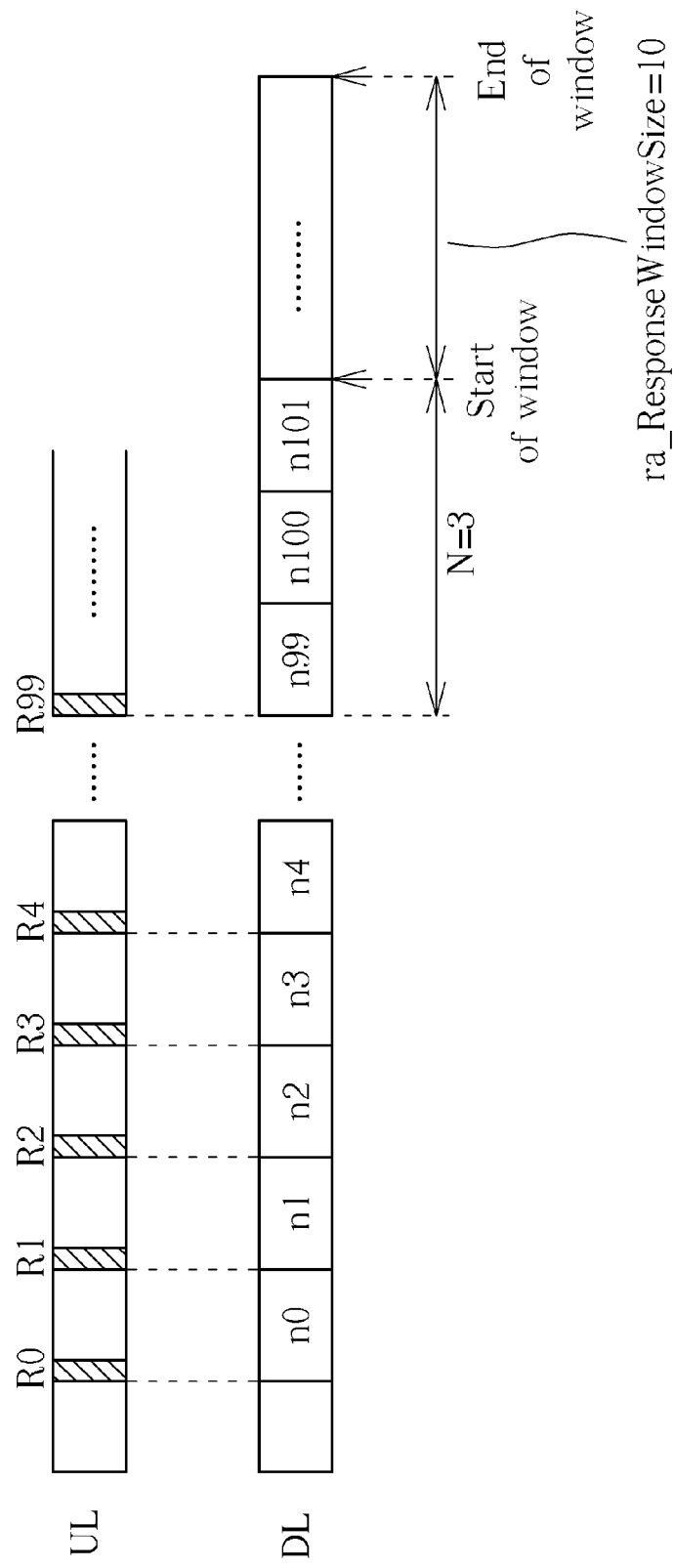
FIG. 10 is a schematic diagram of an exemplary example of the random access response window of the process shown in FIG. 9.

Please refer to FIG. 10, which is a schematic diagram of an exemplary example of the random access response window of the process 90. As shown in FIG. 10, a UE transmits 100 repetitions R0-R99 of a random access preamble to an eNB on a PRACH. The UE may monitor the PDCCH in a random access response window, which starts at the subframe containing the end of the preamble repetition R99 plus N subframes and has a length ra-ResponseWindowSize subframes (e.g., 10 subframes). Please note that N is equal to 3 in the example shown in FIG. 10, but in other embodiments, N may be configured to a value greater than 3, which should not be limited herein.

Please note that in FIGS. 4, 6, 8 and 10, a repetition of a random access preamble may only occupy a part of a subframe, and the transmission of each repetition of the random access preamble may end at a specific subframe, which means that the subframe contains the end of the preamble repetition. For example, in FIG. 4, the preamble repetitions R0-R2 respectively end at the subframes n0, n1 and n3; that is, the subframes n0, n1 and n3 contain the ends of the preamble repetitions R0-R2, respectively. In practice, a repetition of a random access preamble may spread across more than one subframe (e.g., the preamble repetition R2 shown in FIG. 4). In such a condition, determination of the random access response window is performed based on the subframe which contains the end of the preamble repetition (e.g., the subframe n3 for the preamble repetition R2).

Figure 11:
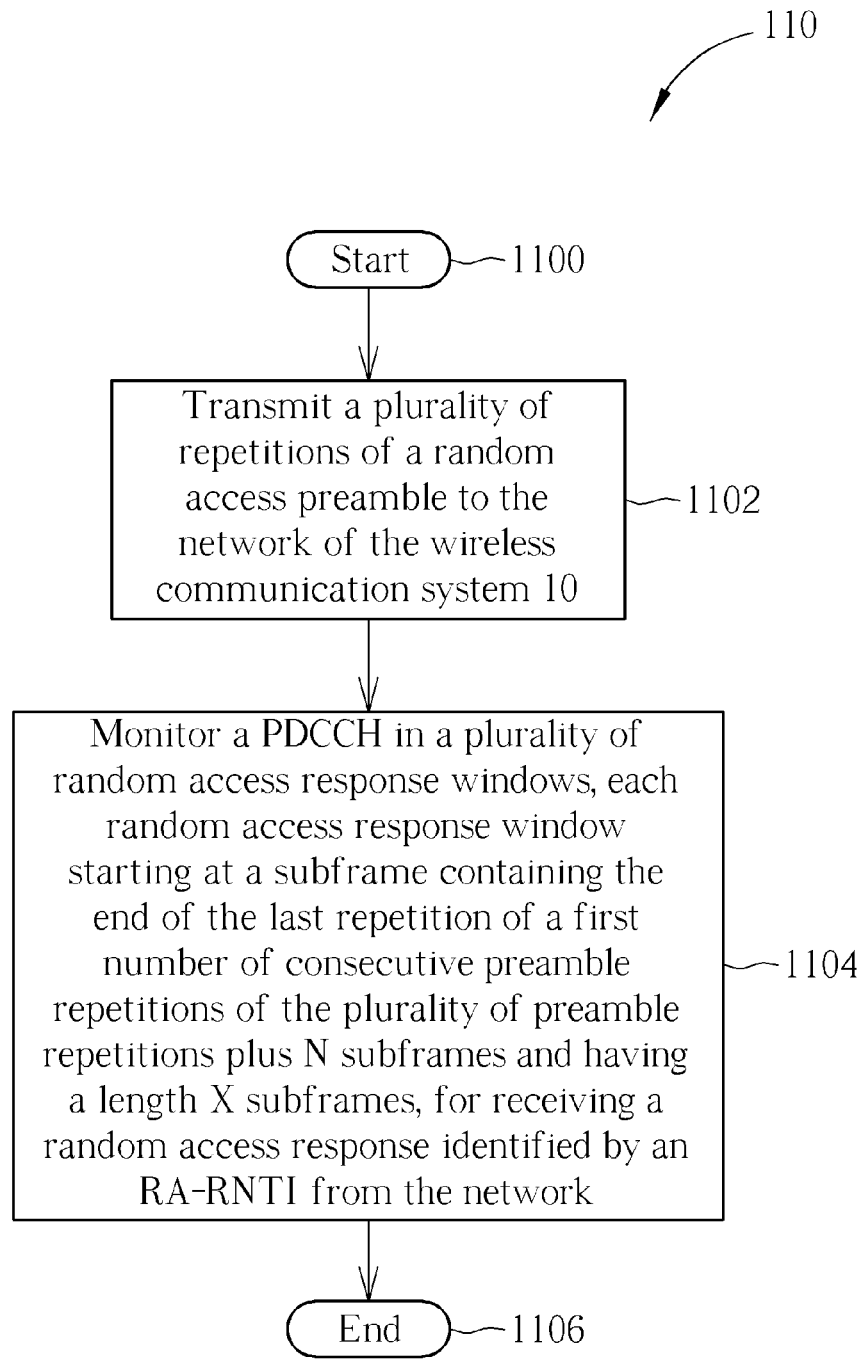
FIG. 11 is a flowchart of a process according to an embodiment of the present invention.

Please refer to FIG. 11, which is a flowchart of a process 110 according to an embodiment of the present invention. The process 110 may be utilized in a UE of the wireless communication system 10 shown in FIG. 1, for handling random access with coverage enhancement. The process 110 may be compiled into the program code 214 and includes the following steps:

Step 1100: Start.

Step 1102: Transmit a plurality of repetitions of a random access preamble to the network of the wireless communication system 10.

Step 1104: Monitor a PDCCH in a plurality of random access response windows, each random access response window starting at a subframe containing the end of the last repetition of a first number of consecutive preamble repetitions of the plurality of preamble repetitions plus N subframes and having a length X subframes, for receiving a random access response identified by an RA-RNTI from the network.

Step 1106: End.

Figure 12:
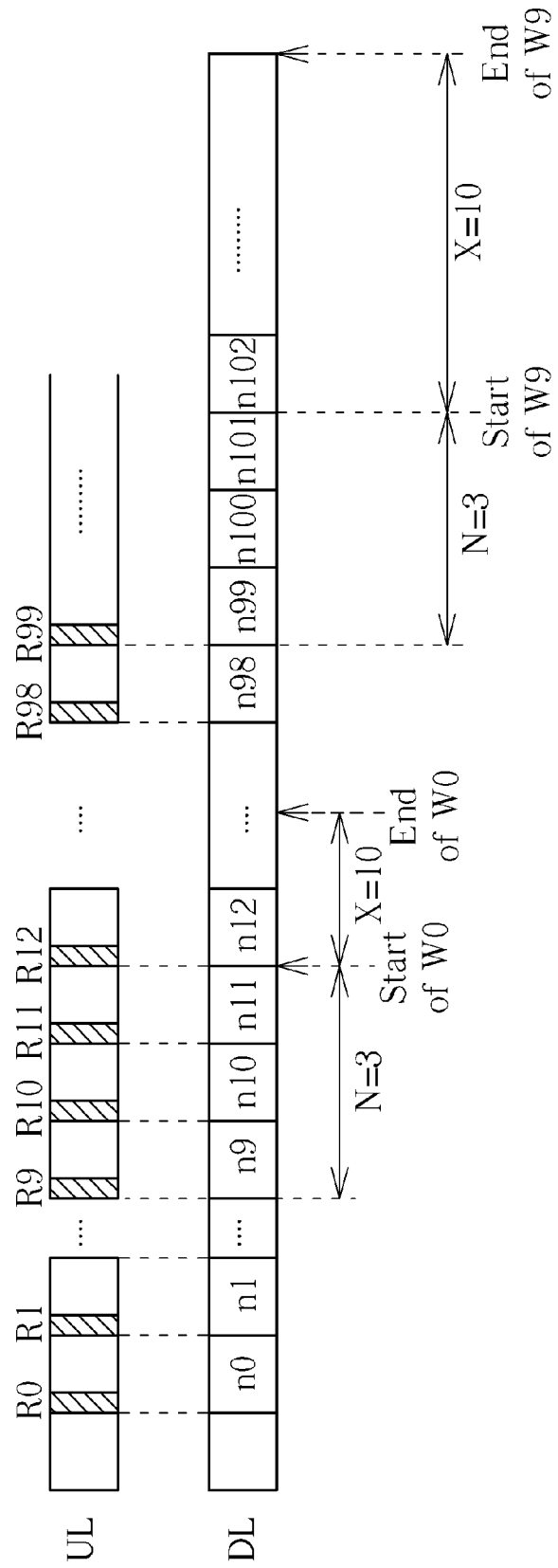
FIG. 12 is a schematic diagram of an exemplary example of the random access response windows of the process shown in FIG. 11.

In addition, FIG. 12 is a schematic diagram of an exemplary example of the random access response windows of the process 110. According to the process 110, the UE in an enhanced coverage mode transmits a plurality of repetitions of a random access preamble on the PRACH in a random access procedure. The UE monitors the PDCCH in the plurality of random access response windows, wherein each random access response window starts at a subframe containing the end of the last repetition of a first number, j, of consecutive preamble repetitions plus N subframes and has a length X subframes, for receiving a random access response identified by a RA-RNTI that identifies which time-frequency resource is utilized by the UE to transmit the random access preamble. In one embodiment, N subframes are greater than or equal to the minimum delay based on the system environment, e.g., 3 ms, and X is a preconfigured random access response window size or a random access response window size ra-ResponseWindowSize (e.g., 10 subframes) as in the conventional art.

In other words, the UE starts a random access response window for every j consecutive preamble repetitions. As an example of FIG. 12, the UE transmits 100 preamble repetitions R0-R99 and the first number j of consecutive preamble repetitions is 10 repetitions; that is, after transmitting preamble repetitions R0-R9, the UE starts monitoring the PDCCH in a random access response window W0 which starts at the subframe containing the end of the last repetition (R9) of 10 consecutive preamble repetitions R0-R9 plus 3 subframes (i.e., the subframe n12) and has a length 10 subframes; and after transmitting preamble repetitions R90-R99, the UE also monitors the PDCCH in a random access response window W9 which starts at the subframe containing the end of the last repetition (R99) of 10 consecutive preamble repetitions R90-R99 plus 3 subframes (i.e., the subframe n102) and also has the length 10 subframes. It should be noted that the process 110 is similar to the process 90 and the only difference is, for the process 90 the random access response window starts after all of preamble repetitions are transmitted, and for the process 110, more than one random access response window is applied and a corresponding random access response window starts after every j preamble repetitions.

Those skilled in the art should readily make combinations, modifications and/or alterations on the abovementioned description and examples. The abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 20.

To sum up, the present invention provides a method of handling random access with coverage enhancement in a wireless communication system. The UE in the enhanced coverage mode may transmit a plurality of repetitions of a random access preamble when initiating a random access procedure to get uplink synchronization with an eNB. In such a condition, the random access response window should be configured based on the transmission of the plurality of repetitions. Therefore, the issue that the UE may interrupt the random access procedure due to unsuccessful reception of the random access response(s) in the random access response window before finishing the repetitions of the random access preamble transmission may be avoided.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling random access for a user equipment of a wireless communication system, the method comprising:

transmitting a plurality of repetitions of a random access preamble in a plurality of subframes to a network of the wireless communication system, wherein each of the plurality of repetitions is transmitted in a separate subframe of the plurality of subframes and not overlapped; and monitoring a physical downlink control channel in a plurality of random access response windows for receiving a random access response identified by a random access radio network temporary identifier (RA-RNTI) from the network, wherein each of the plurality of random access response windows is corresponding to one of the plurality of repetitions of the random access preamble;
wherein at least two of the plurality of random access response windows overlap.

2. The method of claim 1, wherein each of the plurality of random access response windows starts at a subframe containing the end of a corresponding preamble repetition plus N subframes.

3. The method of claim 2, wherein N is greater than or equal to a preconfigured value associated with propagation delay and processing time in the wireless communication system, or a value of N is configured statically or dynamically by the network.

4. The method of claim 1, wherein the length of each of the plurality of random access response windows is a preconfigured length or is configured by the network via system information.

5. A method of handling random access for a user equipment of a wireless communication system, the method comprising:
transmitting a plurality of repetitions of a random access preamble in a plurality of subframes to a network of the wireless communication system; and
monitoring a physical downlink control channel in a random access response window which starts at a first subframe containing the end of the first repetition of the random access preamble plus M subframes and ends at a second subframe containing the end of the last repetition of the random access preamble plus (N+W) subframes, for receiving a random access response identified by a random access radio network temporary identifier (RA-RNTI) from the network.

6. The method of claim 5, wherein M and N are greater than or equal to a preconfigured value associated with propagation delay and processing time in the wireless communication system, or values of M and N are configured statically or dynamically by the network.

7. The method of claim 5, wherein W is a preconfigured value or a value of W is configured by the network via system information.

8. A method of handling random access for a user equipment of a wireless communication system, the method comprising:
transmitting a plurality of repetitions of a random access preamble in a plurality of subframes to a network of the wireless communication system; and
monitoring a physical downlink control channel in a random access response window which starts at a subframe containing the end of the first repetition of the random access preamble plus N subframes and has a length X subframes, for receiving a random access response identified by a random access radio network temporary identifier (RA-RNTI) from the network;
wherein the value of X allows the user equipment to receive the random access response corresponding to the last repetition of the plurality of repetitions of the random access preamble.

9. The method of claim 8, wherein N is greater than or equal to a preconfigured value associated with propagation delay and processing time in the wireless communication system, or a value of N is configured statically or dynamically by the network.

10. The method of claim 8, wherein the length of the random access response window is a preconfigured length or is configured by the network via system information.

11. A method of handling random access for a user equipment of a wireless communication system, the method comprising:
transmitting a plurality of repetitions of a random access preamble in a plurality of subframes to a network of the wireless communication system; and
starting monitoring a physical downlink control channel in a random access response window for receiving a random access response identified by a random access radio network temporary identifier (RA-RNTI) from the network, after transmitting all of the plurality of repetitions, wherein the random access response window starts at a subframe containing the end of the last repetition of the plurality of repetitions of the random access preamble plus N subframes and having a length X subframes.

12. The method of claim 11, wherein N is greater than or equal to a preconfigured value associated with propagation delay and processing time in the wireless communication system, or a value of N is configured statically or dynamically by the network.

13. The method of claim 11, wherein the length of the at least one random access response window is a preconfigured length or is configured by the network via system information.

* * * * *